(12) United States Patent
Lillback

(10) Patent No.: US 7,608,183 B2
(45) Date of Patent: Oct. 27, 2009

(54) CONTROL VALVE ASSEMBLY

(75) Inventor: Raymond Lillback, Streetsboro, OH (US)

(73) Assignee: Kinetico Incorporated, Newbury, OH (US)

( * ) Notice: Subject to any disclaimer, the term of this patent is extended or adjusted under 35 U.S.C. 154(b) by 691 days.

(21) Appl. No.: 10/525,543

(22) PCT Filed: Sep. 4, 2003

(86) PCT No.: PCT/US03/27827

§ 371 (c)(1),
(2), (4) Date: Aug. 11, 2005

(87) PCT Pub. No.: WO2004/022199

PCT Pub. Date: Mar. 18, 2004

(65) Prior Publication Data

US 2006/0096899 A1 May 11, 2006

(51) Int. Cl.
*B01D 24/46* (2006.01)
(52) U.S. Cl. .................. 210/108; 210/190; 210/269
(58) Field of Classification Search .......... 210/106, 210/108, 142, 143, 190, 191, 269, 272, 278; 137/624.18, 624.14
See application file for complete search history.

(56) References Cited

U.S. PATENT DOCUMENTS

| | | | |
|---|---|---|---|
| 3,891,552 A | 6/1975 | Prior et al. | |
| 4,298,025 A | 11/1981 | Prior et al. | |
| 4,889,623 A | * 12/1989 | Prior et al. | ............. 210/190 |
| 5,022,994 A | 6/1991 | Avery et al. | |
| 5,256,283 A | 10/1993 | Buettner | |
| 6,214,214 B1 | 4/2001 | Hansen et al. | |
| 6,444,127 B1 | 9/2002 | Vaughan et al. | |

OTHER PUBLICATIONS

International Search Report PCT/US2003/027827, published Mar. 18, 2004.

* cited by examiner

*Primary Examiner*—Terry K Cecil
(74) *Attorney, Agent, or Firm*—Tarolli, Sundheim, Covell & Tummino, LLP

(57) ABSTRACT

A control valve assembly (10) controls the flow of water to and from a treatment tank (16) and the regeneration of the treatment material therein. A housing of the valve assembly includes connections for a tank inlet and tank outlet, a inlet chamber (60), outlet chamber (34), a pressure-operated inlet valve (24) and an outlet valve (32). A pair of venturi chambers (81*a*, 81*b*) are configured to provide co-current and counter-current regeneration. A regeneration control subsystem includes a turbine (104) and a nozzle impinging thereon to produce rotation. An external port (130) receives fluid to provide a driving for the turbine in order to initiate regeneration. A bypass chamber (60) communicates with the inlet chamber (15). The inlet valve (24) has dual seating surfaces for controlling the communication between the inlet chamber, transfer chamber (70) and tank inlet (26).

18 Claims, 12 Drawing Sheets

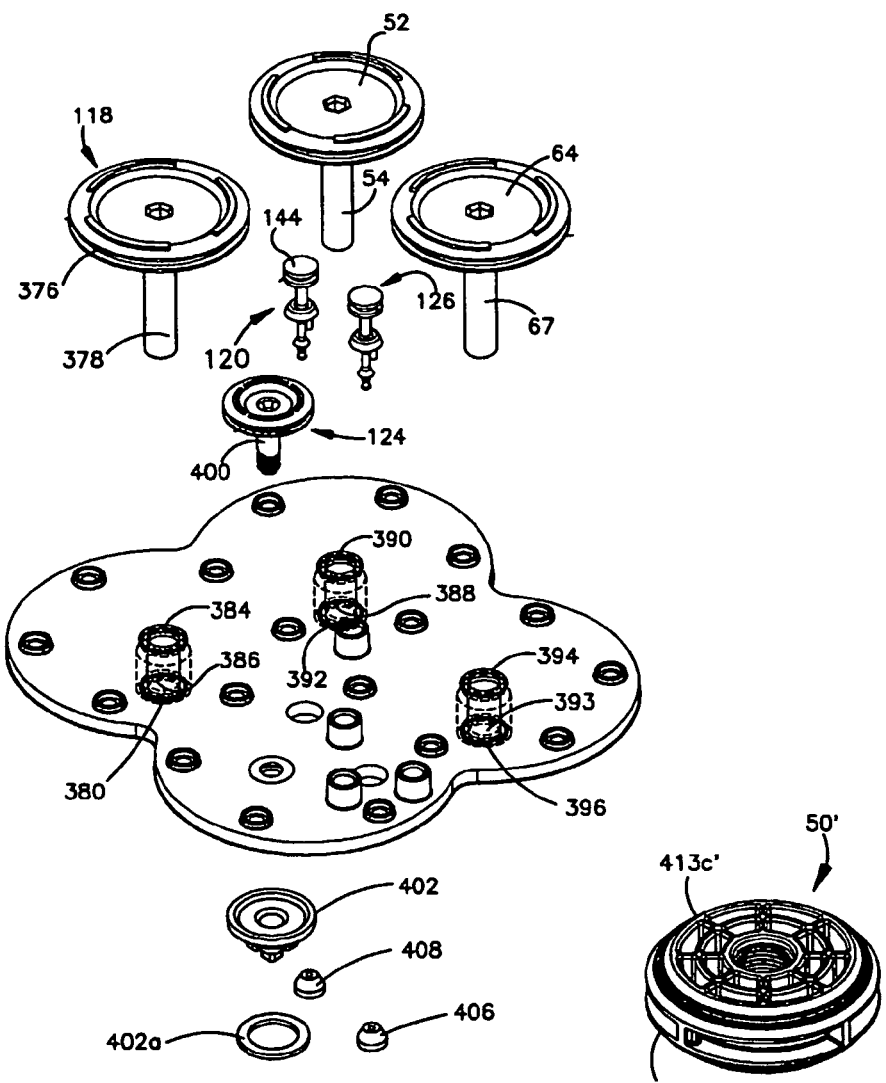
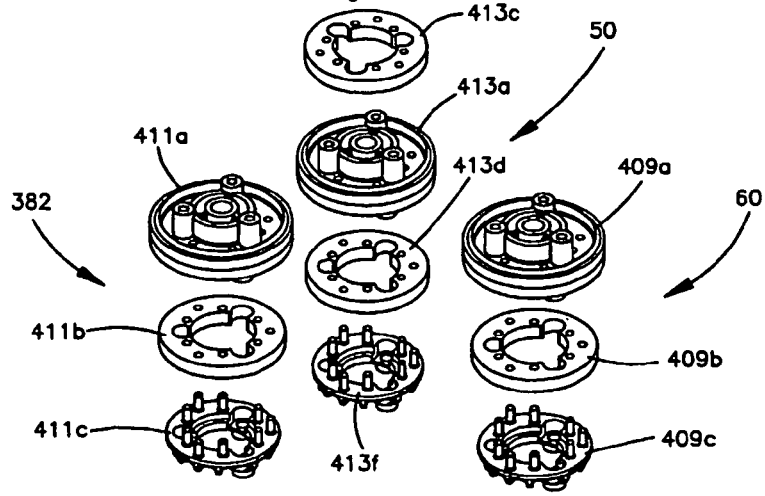
Figure 5
Figure 5A

CONTROL VALVE ASSEMBLY

TECHNICAL FIELD

The present invention relates generally to water treatment and, in particular, to an improved control system and control device for controlling a fluid treatment apparatus.

BACKGROUND ART

Water treatment systems, such as water softeners, usually employ a tank containing treatment material. A control valve normally associated with the tank controls the communication of source water with the tank and may define an inlet for this source water, as well as an outlet for treated water after it passes through the treatment material contained in the tank. Controls valves, such as those illustrated in U.S. Pat. Nos. 3,891,552; 4,298,025 and 6,214,214 also control the regeneration or cleaning of the tank once it is exhausted.

DISCLOSURE OF THE INVENTION

The present invention provides a new and improved control valve assembly n controlling a water treatment apparatus of the type that requires periodic regeneration or cleansing of the water treatment material contained in a treatment tank.

The control valve assembly controls the communication of water to and from a treatment tank and for controlling the regeneration of a treatment material or media contained within the tank. According to the invention, the control valve assembly includes a housing that includes structure for connecting to a tank inlet and a tank outlet forming part of the treatment tank. The housing defines an inlet chamber communicating with a source of water to be treated and an outlet chamber that communicates with an outlet port also forming part of the housing.

A fluid pressure operated inlet valve controls the communication of the inlet chamber with the tank inlet and an outlet valve controls the fluid communication between the tank outlet and the outlet chamber.

A pair of venturi chambers form part of the control valve assembly. One of the chambers can be configured to provide co-current regeneration of the treatment tank, whereas the other of the venturi chambers can be configured to provide countercurrent regeneration. In the preferred and illustrated embodiment, the venturi chambers include removable access covers by which a venturi element contained within the chamber can be removed, replaced or installed making further disassembly of the control valve unnecessary.

According to a feature of the invention, the control valve assembly includes a regeneration control turbine that forms part of a regeneration control subsystem. A nozzle directs fluid into an impinging relationship with the turbine, whereby rotation in the turbine is produced. Structure within the housing defines a regeneration passage that communicates the nozzle with an external port on the housing so that fluid pressure from an external source can be communicated to the nozzle in order to initiate regeneration of the treatment tank attached to the control valve.

According to a further aspect of this feature, the control valve includes a fluid pressure operated regeneration control valve which is selectively operated to provide a fluid to the regeneration passage so that a sustaining fluid flow to the regeneration turbine is provided throughout the regeneration cycle.

According to another feature of the invention, a fluid pressure operated initiation control valve forming part of the control valve assembly is selectively operated in order to communicate a source of fluid pressure from within the control device to an external port on the housing. The port is connectable to a remotely located control valve assembly whereby regeneration in the remotely located control valve can be initiated by selectively operating the initiation control valve.

According to still another feature of the invention, the housing defines a bypass chamber in fluid communication with the outlet chamber. In the preferred embodiment, the fluid pressure operated inlet valve controls the communication of the inlet chamber with the tank inlet and controls the communication of the inlet chamber with the bypass chamber. In the illustrated embodiment, the inlet valve has dual seating surfaces engageable with spaced apart seats, one of which controls the communication of the inlet chamber with the tank inlet, the other of which controls the communication of the inlet chamber with the bypass chamber. According to this embodiment of the invention, when a tank to which the control valve is attached is being regenerated, water is allowed to flow form the source directly to the outlet of the valve thereby bypassing the treatment tank.

According to another feature of the invention, a drain region forming part of the regeneration control subsystem may be connected to a separate drain to avoid cross contamination of drainage fluids being discharged by the control valve assembly.

Additional features of the invention and a fuller understanding will be obtained by reading the following detailed description made in connection with the accompanying drawings.

BRIEF DESCRIPTION OF DRAWINGS

FIG. 5 is an exploded view of a valve plate assembly that is shown in FIG. 4;

FIG. 5A is a perspective view of an alternate valve element that can be substituted for certain valve elements shown in FIG. 5;

BEST MODE FOR CARRYING OUT THE INVENTION

Figure 1:
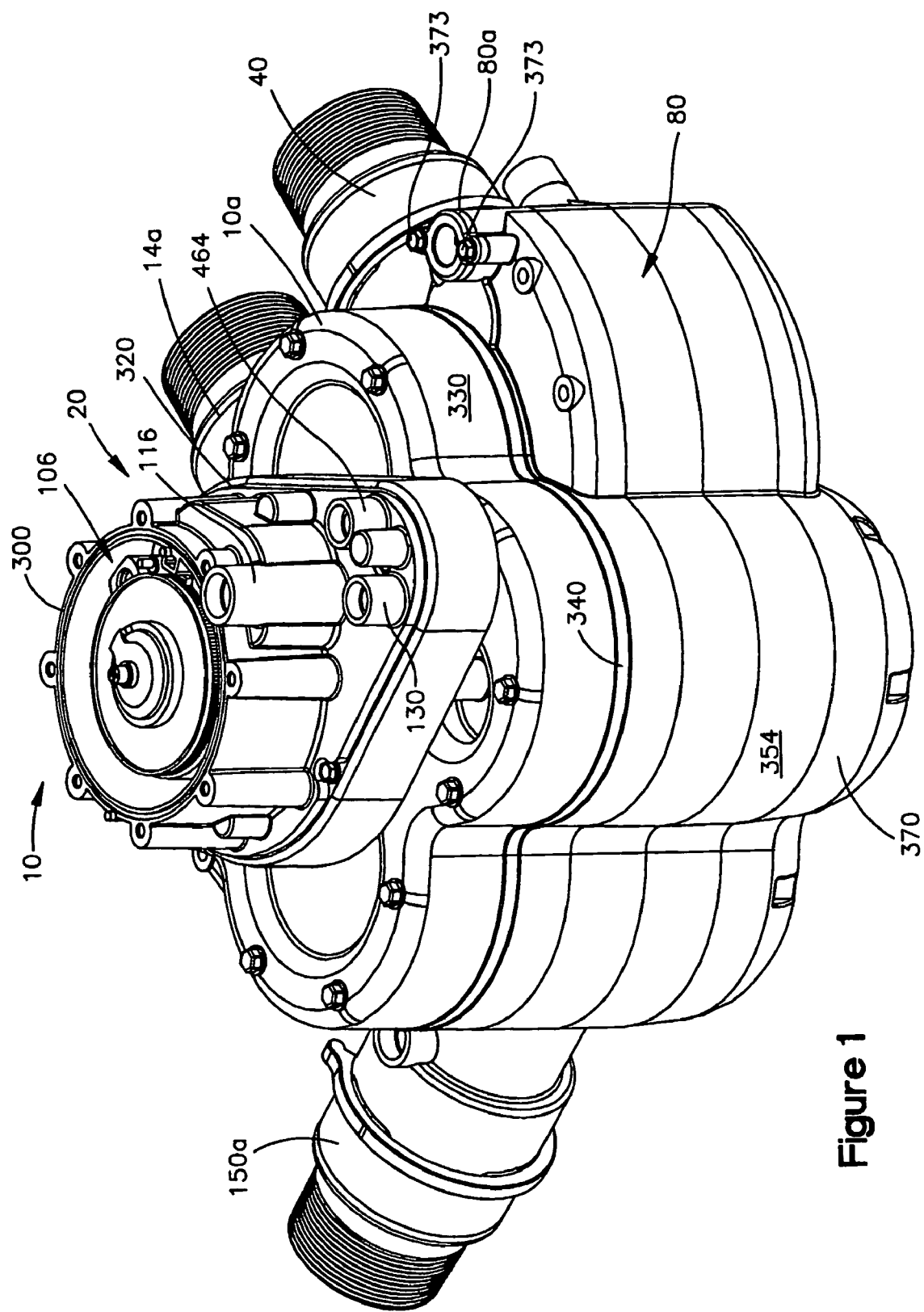
FIG. 1 is a perspective view of a control valve constructed in accordance with the preferred embodiment of the invention.
Figure 2:
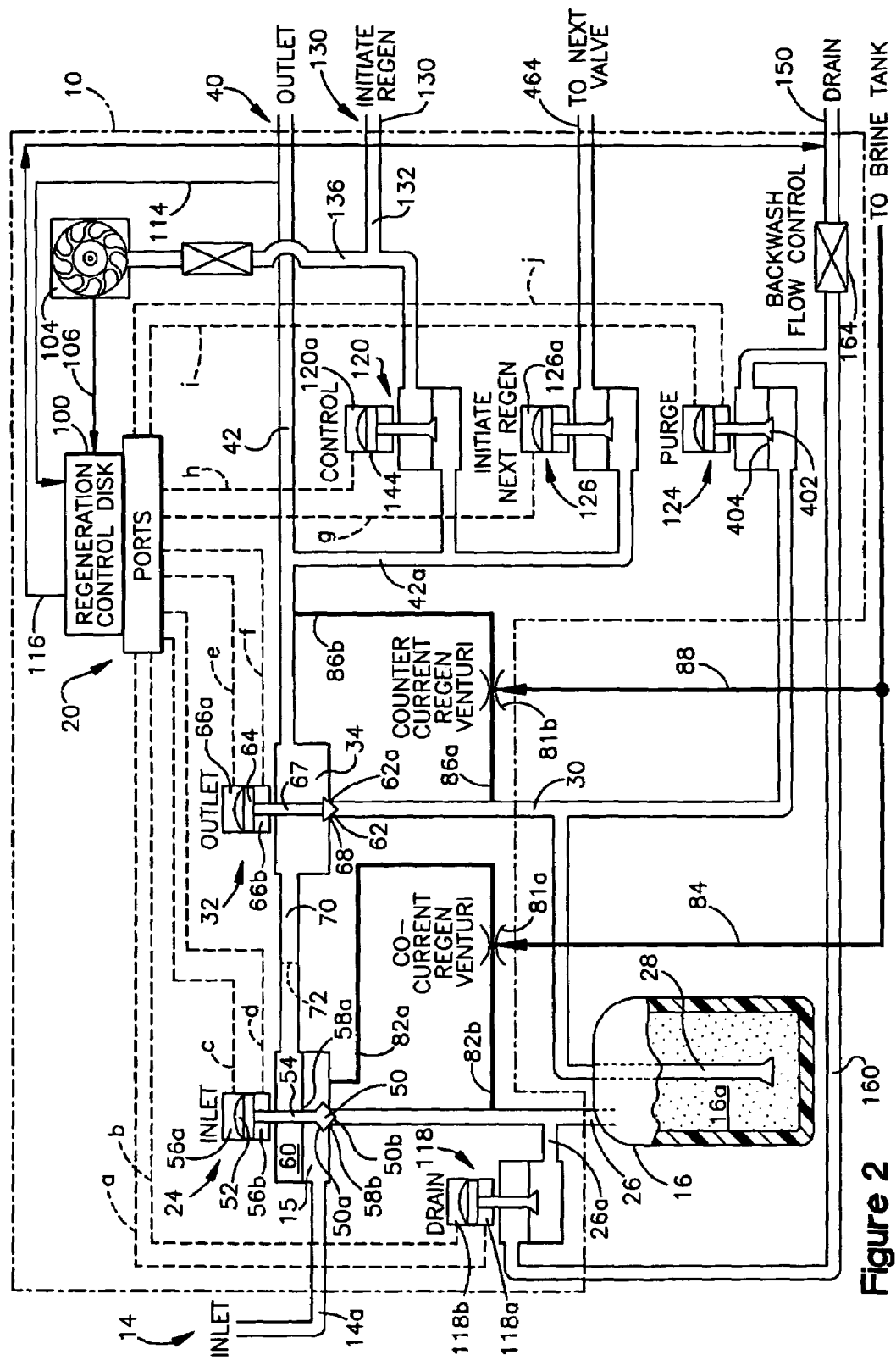
FIG. 2 is a schematic representation of a water treatment apparatus utilizing the control valve shown in FIG. 1.

FIG. 1 illustrates the overall construction of a control valve 10 embodying the present invention. FIG. 2 schematically illustrates the control valve of FIG. 1 that forms part of a water treatment system, at least a portion of which is also illustrated, schematically in FIG. 2.

In general, the control valve 10 controls the communication of source water to be treated as delivered to an inlet 14 with a treatment tank 16 (shown in FIG. 2). The treatment tank 16 is of known configuration and may include a treatment material 16a such as a water softening resin. The treatment tank may include other types of materials, such as those used in the treatment of water to produce deionized water. It may also include a filtering material for removing particle contaminants or solids from the source water.

The control valve assembly 10 of the present invention not only controls the communication of source water with the treatment tank, but also controls the regeneration or cleaning of the treatment material 16a contained within the tank. The control valve assembly 10 bears some similarity to the control valves described in U.S. Pat. Nos. 3,891,552; 4,298,025 and 6,214,214, which are hereby incorporated by reference. Unlike the control valves disclosed in the above-mentioned patents, the control valve 10 of the present invention is intended to control fluid communication with a single tank. However, the valve of the present invention also has provisions for controlling the initiation of a regeneration cycle in other treatment tanks (not shown) that may form part of the overall water treatment system.

The control valve assembly 10 includes a plurality of water pressure operated valves, the opening and closing of which are controlled by a fluid signal control system indicated generally by the reference character 20. The fluid signal control system bears some functional similarity to the fluid signal control system disclosed in the above-referenced patents.

The control valve 10 includes a fluid pressure operated inlet valve indicated generally by the reference character 24 that controls the communication of source water from an inlet chamber 15 with an inlet passage or conduit 26 connected to the treatment tank 16. (The inlet 14 communicates with the inlet chamber 15 via inlet passage 15.) In the illustrated embodiment, the conduit 26 communicates with the top of the tank so that when the inlet valve 24 opens, the source water enters the top of the tank and travels down through the treatment material 16a. The treated water leaves the tank through a riser tube 28 that has an opening near the bottom of the tank. The riser tube 28 is fluidly connected to an outlet passage 30, at least a portion of which is internal to the control valve 10. A fluid pressure operated outlet valve 32 controls the communication of the outlet passage 30 with an outlet chamber 34. The outlet chamber 34 in turn communicates with a outlet port indicated generally by the reference character 40 via an outlet passage 42. The outlet port 40 may be connected to a water distribution system and/or to a common manifold which cross-communicates the outlet ports of other control valves (not shown) in a multi-tank treatment system.

The inlet valve 24 includes a stem mounted valve element 50 having upper and lower seating surfaces 50a, 50b. The valve element 50 is connected to a piston 52 by an elongate stem 54. The piston 52 is reciprocally mounted within a piston chamber having an upper chamber portion 56a and a lower piston chamber portion 56b. Pressurization of the upper piston chamber 56a and simultaneous venting of the lower piston chamber 56b produces downward movement in the piston 52 and drives the valve element 50 and, in particular, the lower seating surface 50b into sealing contact with a lower seat 58b located in the inlet chamber 15 (this position is shown in FIG. 2). With the valve element 50 in this position, fluid flow from the inlet 14 to the tank inlet passage 26 is inhibited.

When the lower piston chamber portion 56b is pressurized (and the upper chamber 56b is simultaneously vented), the piston 52 is driven upwardly which produces attendant upward movement in the valve element 50 until it sealingly contacts an upper seat 58a. In this position, the valve element 50 allows fluid flow from the inlet 14 into the tank inlet passage 26 (via the inlet chamber 15) while inhibiting fluid flow from the inlet 14 into a bypass chamber 60 (to be described).

The outlet valve 32 is similar to the inlet valve 24, except that in the preferred embodiment, it has a valve element 62 with only one seating surface 62a. The valve element 62 is connected to a piston head 64 via an elongate stem 67. The piston head 64 is reciprocally moved within the piston chamber having an upper chamber portion 66a and a lower chamber portion 66b. When the upper chamber portion 66a is pressurized and the lower chamber 66b is vented, the piston 64 is driven downwardly and causes the valve element 62 to sealingly engage its associated seat 68 thereby inhibiting fluid communication between the tank outlet 30 and the outlet chamber 34. When the lower chamber portion 66b is pressurized and the upper chamber 66a is vented, the piston 64 is driven upwardly which produces attendant upward movement in the valve element 62 which then allows fluid communication between the outlet passage 30 and the outlet chamber 34. The piston chambers 56a, 56b, 66a, 66b forming part of the inlet and outlet valves 24, 32 are pressurized by fluid signals generated by the fluid signal control system 20 or are vented through fluid paths associated with the control system 20.

The disclosed control valve 10 may be optionally configured to provide a bypass function. To achieve this feature, the bypass chamber 60 and outlet chamber 34 are interconnected by a transfer passage 70. With the disclosed configuration, when the inlet valve 24 (the outlet valve 32 may also be closed) is in the closed position, i.e., when the valve element 50 is moved downwardly to engage its seat 50b, source water is allowed to flow from the inlet chamber 15 through the bypass chamber 60, the transfer passage 70 and into the outlet chamber 34. From there, the source water is allowed to flow into the outlet 40.

The bypass feature is intended to be used in a water treatment system that utilizes only one treatment tank. In this type of system, when the tank 16 requires regeneration both the inlet and the outlet valves 24, 32 are closed which allows the source water to travel directly to the outlet 40 during the time the tank is being regenerated. Thus, the water supply is not interrupted during regeneration in a single tank system.

When the bypass function is not needed, i.e., in those systems where multiple tanks are employed to treat the source water, an isolation wall 72 (indicated in phantom) is installed in order to block communication between the inlet and outlet chambers.

The disclosed control valve 10 may be configured to provide co-current regeneration, counter-current regeneration or both. As will be described in more detail, the control valve 10 includes a pair of venturi chambers indicated generally by the reference character 80 (only one is shown in FIG. 1). The venturi chambers 80 may be fitted with replaceable venturi elements 81a, 81b (shown schematically in FIG. 2). The co-current regeneration venturi 81a is communicated with the inlet chamber 15 and inlet passage 26 (downstream of the inlet valve 24) by branch passages 82a, 82b. The throat of the venturi is connected to a source of regeneration solution via conduit 84. In a water softening application, the source of regeneration solution may be a brine reservoir.

The counter-current regeneration venturi 81b is fluidly connected to the outlet chamber 34 (or outlet conduit 42) and the outlet passage 30 (upstream of the outlet valve 32) by branch passages 86*a*, 86*b*. The throat of the venturi 80*a* is connected to a suitable source of regeneration solution by a conduit 88.

For many, if not most applications only one venturi is utilized. According to the preferred embodiment, the control valve may be configured for either co-current regeneration or counter-current regeneration at the factory or as part of installation. Both venturis may be utilized to provide a two-step regeneration process. For example, a first regeneration solution can be passed in a co-current regeneration solution followed by introduction of a second regeneration solution which is passed through the resin bed in a counter-current direction via the counter-current regeneration venturi. In this latter described application, the venturi feed conduits 84, 88 could be connected to separate sources of regeneration solutions.

The regeneration sequence is controlled by a regeneration control disc 100 which bears some functional similarity to the regeneration control discs disclosed in U.S. Pat. Nos. 3,891,552; 4,298,025 and 6,214,214. In the preferred and illustrated embodiment of the invention, the regeneration control disc 100 is driven by a water driven turbine 104. The turbine 104 is mechanically connected to the regeneration control disc through a gear train and/or a pall/ratchet mechanism indicated schematically by the reference character 106 in FIG. 2. Details of mechanisms which can be utilized to mechanically interconnect the water driven turbine 104 with the regeneration control disc 100 are discussed in detail in the above-referenced patents. The present invention, however, also contemplates the use of motors and other driven devices for effecting and controlling movement of the regeneration control disc 100.

Figure 3:
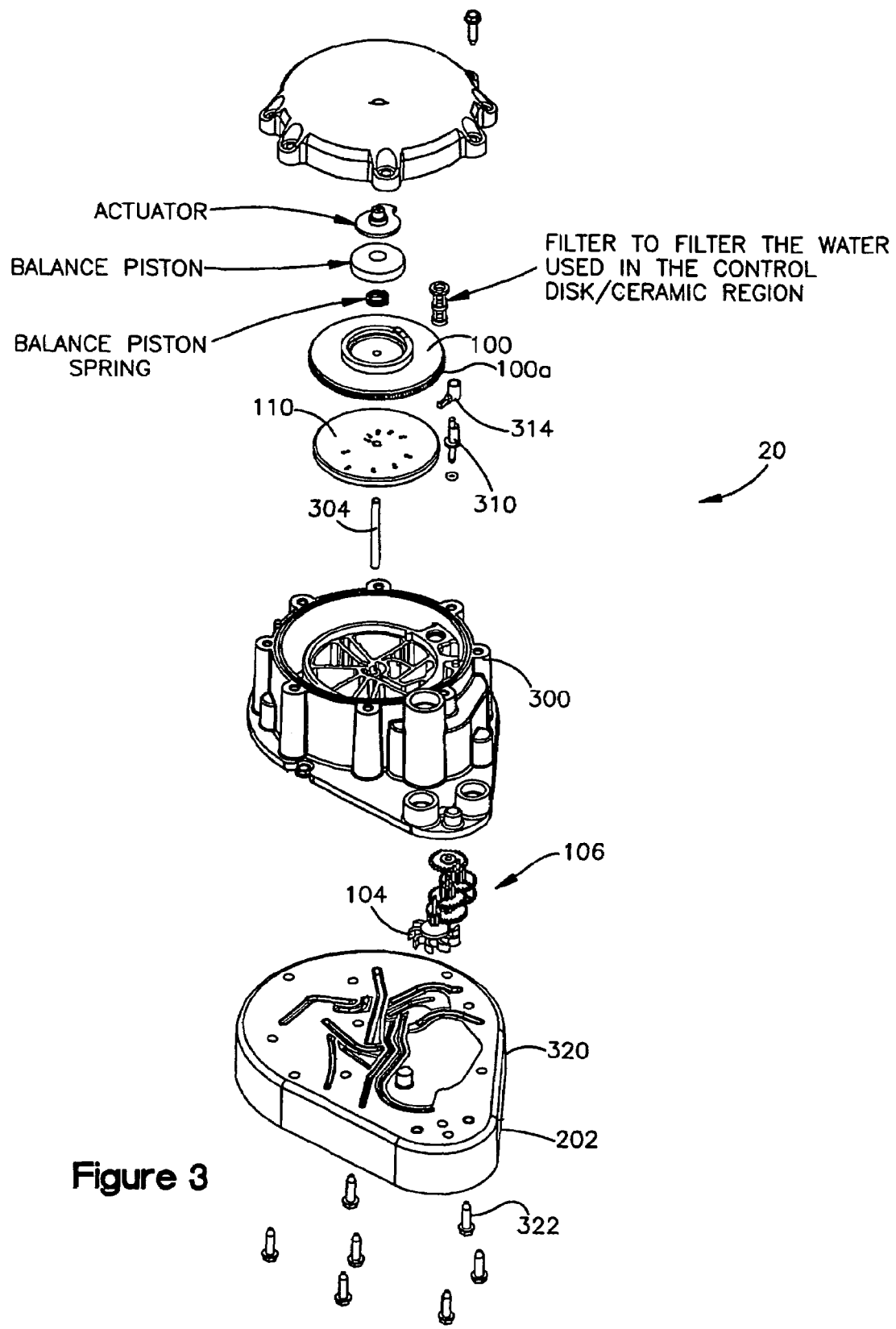
FIGS. 3 and 4 comprise an exploded view of the control valve shown in FIG. 1.

Referring also to FIGS. 3 and 15, the regeneration control disc 100 rotates atop an annular insert 110 that defines a plurality of ports each communicating with an associated signal line. Signal lines a-j are illustrated in FIG. 2. Each line extends from the port insert 110 to one of a plurality of piston chambers. The regeneration control disc sealingly engages the top surface of the insert 110 and includes structural formations on its underside that define a "pressure region" and a "drain region" that operate to communicate the ports formed in the port insert 110 with either water supply pressure (supplied by a passage 114 which is connected to the outlet passage 42) or ambient pressure (by communicating the ports with a drain passage 116) shown in FIG. 2. The ports in the insert 110 and the regeneration control disc 100 are arranged so that as the regeneration control disc rotates, pistons to which the signal lines a-j are connected, are sequentially operated in order to open and close associated valves so that the tank 16 is put through a regeneration process.

Other fluid pressure operated valves that are utilized during the regeneration cycle include a drain valve 118, a regeneration control valve 120, a purge valve 124 and an regeneration initiation valve 126 which is used to initiate regeneration in another control valve 10 in a multi-tank system.

In the preferred and illustrated embodiment, the regeneration process is initiated by a external fluid signal. An initiate regeneration port 130 is provided on the valve. The port 130 is connected to a branch passage 132 in the control valve that communicates with a turbine feed passage 136. The feed passage delivers fluid to a fluid nozzle associated with the turbine 104. The passage 136 includes a flow control element 18 for controlling the rate at which fluid is fed to the nozzle. The nozzle is arranged to direct a fluid stream against the turbine blades of the turbine 104 in order to produce rotation. Rotation of the turbine in to turn produces rotation in the regeneration control disc 100. As seen in FIG. 15, the underside of the regeneration control disc 100 includes a depending wall 140 which serves as a demarcation between a pressurized region 140*a* which is exposed to outlet pressure and a depressurized region 140*b* which communicates with the ambient drain 150. As the regeneration control disc rotates, ports defined in the port insert 110 which are connected to the various signal lines a-j, are pressurized and depressurized depending on the position of the regeneration control disc 100 with respect to the port insert 110.

As indicated above, and as shown in FIG. 2, the "drain region" of the regeneration control disc 100 is communicated with the ambient drain 150. However, it should be noted that the "drain region" can be connected to a separate ambient drain if cross communication of drainage fluids are to be avoided. As seen in FIG. 1, a drain port 116 forms part of the control valve housing and can be connected (via a suitable fluid line) to either the drain 150 or to a totally separate drain.

As indicated above, regeneration is initiated by communicating a source of fluid under pressure to the initiate regeneration port 130. Fluid entering this port is conveyed to the turbine 104 via the passages 132, 136. (Flow from the passage 132 to a branch outlet passage 42*a* is blocked by a closed regeneration control valve 120. As the fluid leaves the turbine nozzle, the regeneration turbine is caused to rotate which in turn produces rotation in the regeneration control disc 100. After a predetermined movement in the control disc 100, a "control valve" port (shown in FIG. 15) is exposed to pressurized fluid which causes the pressurization of an upper chamber 120*a* of the control valve piston chamber via signal line h. The pressurization of the chamber 120*a* drives a control piston 144 downwardly causing the associated valve element to open thus allowing pressurized fluid in the branch outlet passage 42*a* to flow into the regeneration turbine feed passage 136. The opening of the control valve 120 thus provides a sustaining source of pressurized fluid for the regeneration turbine 104 throughout the regeneration cycle allowing the initiate regeneration signal to be terminated (that is communicated to the port 130).

If the control valve 10 has been configured to provide a counter-current regeneration step, the regeneration control disc 100 and associated port insert 110 are configured so that the upper chambers 56*a*, 66*a* of the inlet and outlet valves 24, 32 are pressurized via signal lines c, e (the respective lower chambers 56*b*, 66*b* are vented via signal lines d and f); a lower chamber 118*a* of the drain valve 118 is pressurized while its associated upper chamber 118*b* is vented in order to drive the piston upwardly thus opening the drain valve 118 and allowing the inlet passage 26 to communicate with a drain passage 160. The drain passage communicates with the ambient drain 150 and includes a flow controller 164 for controlling the rate of flow of fluid being drained. Since the outlet valve 32 is closed, fluid in the outlet chamber 34 is allowed to flow into the counter-current regeneration venturi 81*b* via the passage 86*b* and then into the outlet passage 30 via the passage 86*a*. As fluid flows through the venturi 81*b*, regeneration solution is drawn into the venturi and mixed with the fluid thus creating the regeneration solution. The regeneration solution flows into the tank 16 in a counter-current direction via the riser tube 28. It leaves the riser tube at the bottom of the tank, flows through the treatment material 16*a* and leaves the tank 16 via the passage 26. The solution then travels through the drain valve 118 and is discharged to the ambient drain 150 via the passage 160.

Depending on the regeneration solution source, the tank 16 may be subjected to a slow rinse. For example, if only a predetermined quantity of regeneration solution is available to be communicated to the venturi 81*b*, once the supply is exhausted only the fluid from the outlet chamber 34 will pass through the venturi 81b and into the tank 16. The absence of regeneration solution in the passage 88 will cause the fluid communicated via the passage 86b to simply rinse the tank 16. Generally an external device such as a brine control valve is used to control the communication of the regeneration chemical i.e. brine, with the venturi. Once a predetermined amount of regeneration chemical is delivered, the communication of the regeneration chemistry reservoir with the venturi is terminated and a slow rinse ensues since regeneration chemistry is no longer being drawn into the venturi. These external control devices may also comprise air checks, solenoid valves, hand valves, etc. An example of a external control device (brine valve) is disclosed in U.S. Pat. No. 4,889,623, which is hereby incorporated by reference.

Following the slow rinse step, if such as step forms part of the regeneration cycle, the outlet valve 32 may be opened by supplying a suitable signal to the lower outlet chamber 66b (via signal line f) in order to open the outlet valve. Opening the outlet valve will allow fluid in the outlet chamber 34 to flow through the tank 16 in a counter-current direction and be discharged to the ambient drain 150 via the open drain valve 118. The flow control element 164 in the drain passage constrains the rate of flow within predetermined limits.

If desired, the regeneration control disc 100 and port insert 110 can be configured to provide a co-current fast rinse or what is sometimes termed a "downflow" fast rinse. To achieve this feature, the regeneration control disc 100 and the port insert 110 are configured to provide fluid signals to the drain valve 118 to effect its closure (via signal lines a and b), a fluid signal to the outlet valve 32 to effect it closure (via signal lines e and f), a fluid signal to the inlet valve 24 to effect its opening (via signal line c and d) and a fluid signal to the purge valve 124 to effect its opening via signal line i (signal line j is vented). With the drain and outlet valves 118, 32 closed and the inlet and purge valves 24, 124 open, source water is allowed to proceed from the inlet 14, through the treatment tank 16 and then to the drain 150 via the open purge valve 124 and associated purge passage 172 (that communicates with the drain passage 160.) The flow control element 164 in the drain passage constrains the rate of flow within predetermined limits.

At the conclusion of the regeneration cycle, the regeneration control disc 100 and port insert 110 are configured so that as the disc 100 nears the end of one full revolution, the appropriate signal lines are pressurized and depressurized in order to produce and maintain, opening of the inlet valve 24, the outlet valve 32 and closure of the control and purge valves 120, 124, thus placing the treatment tank 16 "on line." Once the regeneration control valve 120 is closed, the source of pressurized water flow to drive the regeneration control turbine 104 is terminated and, hence, rotation of the regeneration control disc 100 ceases.

As indicated above, the control valve 10 may be configured to pass regeneration solution through the treatment tank in a co-current direction. To achieve this feature, the regeneration control disc 100 and port insert 110 are configured so that at a predetermined position of the regeneration control disc 100 with respect to the port insert 110 produces the following operation in the various valves. Fluid control signals are generated to close the inlet and outlet valves 24, 32 while opening the purge valve 124. The co-current regeneration venturi 81a connects the inlet chamber 15 with the inlet passage 26 downstream of the inlet valve 24 via the passages 82a, 82b. As a result, source water flows through the venturi 81 a and as it flows through the venturi, regeneration solution is drawn into the throat of the venturi via the regeneration supply passage 84. As is the case with the counter-current regeneration venturi, if the source of regeneration solution is terminated (by an external device i.e. brine valve), the continuing flow of source water through the venturi acts as a slow rinse as it passes through the treatment tank. The regeneration solution flows through the tank in the co-current direction, leaves the tank 16 through the riser tube 28 and is discharged to the drain 150 via the open purge valve 124. By suitable configuration of the port insert 110 and regeneration control disc 100 other process steps can be implemented, such as a fast downflow rinse (achieved by opening the inlet valve 24). A rinse in the counter-current direction can be achieved by opening the outlet valve 32, closing the purge valve 124 and opening the drain valve 118 thus allowing treated water in the outlet chamber 34 to flow through the tank 16 and then to the drain 150 via the open drain valve 118. The flow control element 164 in the drain passage constrains the rate of flow within predetermined limits.

At the conclusion of the regeneration cycle, the initiate next regeneration control valve 126 is open by pressurizing an upper piston chamber 126a with a fluid signal from the servo control system 20 via signal line g. Opening of the initiate next regeneration valve 126 communicates fluid (water) under pressure to the initiate regeneration port oh a remote valve thus initiating regeneration in a remote tank (not shown).

As indicated above, the disclosed control valve may be configured with both venturis 81a, 81b installed in order to provide a two-step regeneration process. In order to achieve this feature, modifications to the valve would be necessary in order to prevent flow through the inactive venturi, while the active venturi is drawing regeneration chemistry. For example, during a counter current regeneration step, the flow along the venturi line 86b which feeds the countercurrent regeneration venturi 81b must be blocked in order to inhibit flow across the countercurrent regeneration venturi. Conversely, during co-current regeneration step, flow along the path 82a must be blocked in order to inhibit flow of water through the co-current regeneration venturi 81a. The blocking of the flow paths can be achieved with various devices which may include solenoid operated valves, hand valves, etc.

FIGS. 1 and 3-5 illustrate the componentry of the control valve 10 which is illustrated schematically in FIG. 2. To facilitate the description, components illustrated in FIGS. 3-5, which are shown schematically in FIG. 2, will be designated by the same reference character.

The control valve 10 includes a housing 10a formed from a plurality of individual molded housing portions that are stacked and suitably joined together by fasteners, adhesives, etc. in order to define the various chambers discussed above and shown schematically in FIG. 2. In the preferred and illustrated embodiment, the control valve housing 10a defines a multilevel component which is similar in construction to the control valves illustrated in U.S. Pat. Nos. 3,891,552; 4,298,025 and 6,214,214, which are hereby incorporated by reference and are attached as appendices I. II and II. However, as indicated above, the disclosed control valve is intended to function in connection with a single treatment tank 16 (shown schematically in FIG. 2) as opposed to dual tanks as is the case with the control valves disclosed in the above-referenced patents.

For purposes of explanation, the housing portions and associated components will be referred to as "levels".

Turning first to FIG. 3, the servo system 20 described previously and shown schematically in FIG. 2, comprises level 1 and level 2 housing members of the control valve.

Level 1 is a molded housing structure 300 which operatively mounts the regeneration control mechanism. In particular, the housing 300 mounts a support pin 304 which extends through the port insert 110 and defines an axis of rotation for the regeneration control disc 100. As more fully disclosed in the above-referenced patents, the control disc 100 rotates atop the insert 110 which may be constructed of ceramic. The wall structure 140 (see FIG. 15) depending from the bottom of the control disc 100 serves to pressurize and depressurize ports defined by the port insert 110 as the control disc 100 rotates atop the disc. In the preferred and illustrated embodiment, and as more fully described in the above-referenced patents, the control disc is driven by a turbine 104 and associated gear train 106. In the illustrated embodiment, a periphery of the control disc 100 include ratchet teeth 100a which are engageable by a ratchet mechanism made up of an eccentric pin 310 driven by the gear train 106 which, in turn, moves a pawl 314 in an eccentric, ratcheting motion to cause movement in the control disc 100.

The ports defined on the port disc 110 communicate with the signal lines a-j (shown schematically in FIG. 2) which, as described above, communicate with the various piston chambers. At least portions of the passages which define the signal lines a-j are defined by a level 2 housing portion 320, which is secured to the level 1 housing portion 300 by a plurality of fasteners 322.

Figure 4:
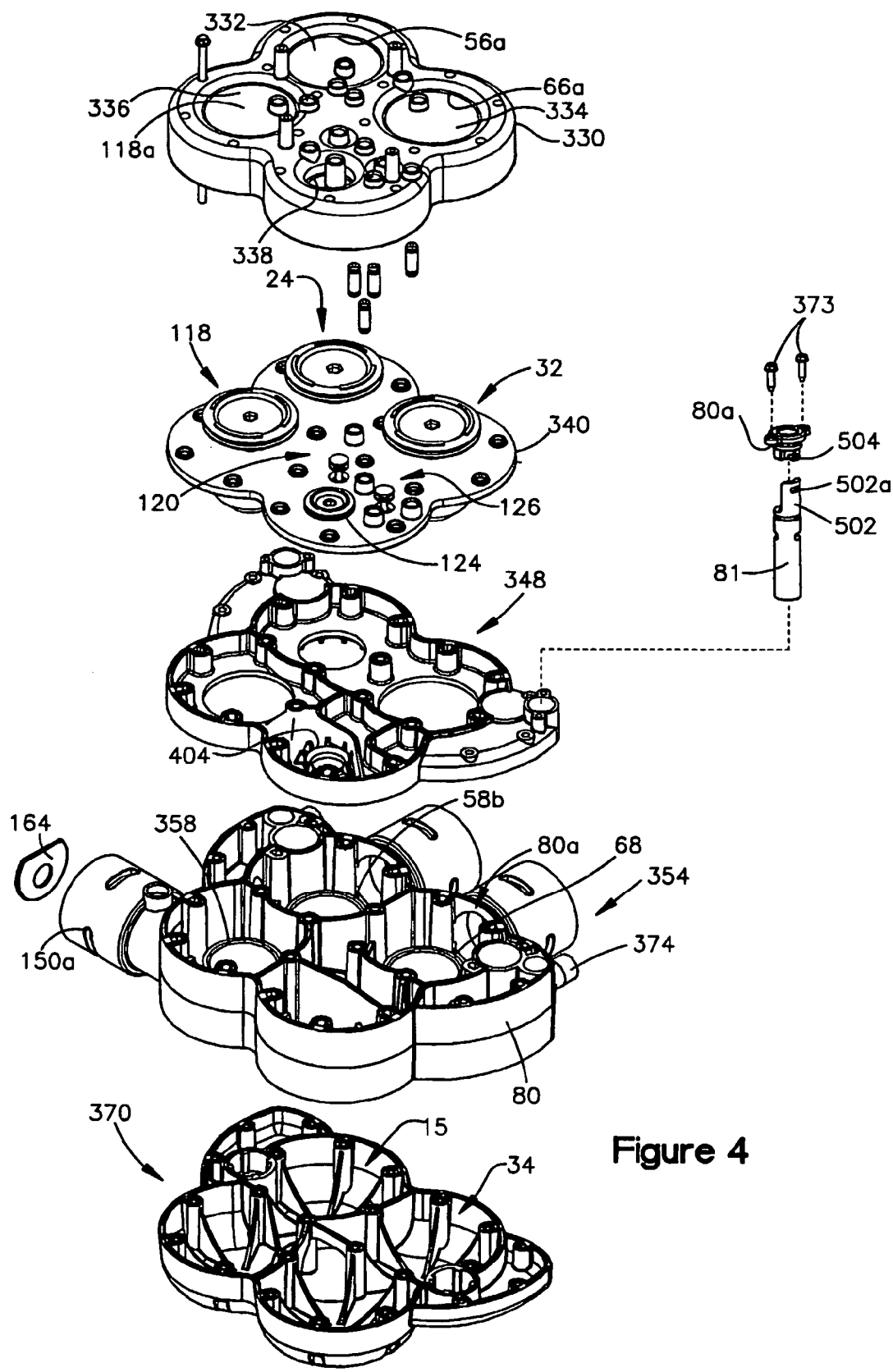

Referring to FIG. 4, a level 3 housing portion 330 defines the piston chambers for the inlet valve 24, the outlet valve 32, the drain valve 118 and the purge valve 124. In particular, the housing portion 330 defines circular openings 332, 334, 336 and 338 which slidably receive the piston heads of the inlet valve 24, outlet valve 32, drain valve 118 and purge valve 124. As also seen in FIG. 4, a valve plate 340 which comprises a "level 4" mounts and reciprocally supports the drain valve 118, the inlet valve 24, the outlet valve 32, the control valve 120 and the purge valve 124. The level 4 valve plate 340 is clamped between the level 3 housing 330 and a level 5A housing 348 that defines at least some of the seating surfaces for the valves carried by the level 4 valve plate 340.

As indicated above, the level 4 valve plate 340 is clamped between housing portions 330 and 348. Although not shown, in the preferred embodiment, seals are employed between the housing components and valve plate to inhibit leakage between the assembled components. The type of seals that are preferably used are similar to those shown in the above-referenced patents. Alternately, sealing compounds may be employed. It should be noted here, that seals are generally employed between adjacent housing components, including those to be described. The seals themselves do not form part of the invention and, hence, are omitted for brevity.

Referring to FIG. 4, fluid couplings 357 are used to interconnect passages defined by the level 3 housing portion 330 and the valve plate 340. It should be noted here that similar fluid couplings (not shown) are used to interconnect fluid passages between other levels, such as between the level 2 housing component 320 and the level 3 housing component 330.

As seen in FIG. 4, a level 5b housing 354 sealingly engages the underside of the level 5a housing portion 348. The level 5b housing portion 354 defines a plurality of valve chambers and, in particular, defines the lower seat 58b for the inlet valve 24, the outlet valve seat 68 and a drain valve seat 358. The backwash flow control 164, illustrated schematically in FIG. 2, is mounted in the outlet port 150a which is integrally molded with the housing level 5b and is normally connected to the ambient drain 150 (shown in FIG. 2). With the disclosed construction, the backwash flow control can be serviced, replaced or cleaned without disassembling the control valve 10.

As seen in FIG. 4, a "level 6" portion 370 of the valve housing 10a sealingly engages the underside of the "level 5b" housing portion 354. The "level 6" housing portion 370 defines the tank connection and, in particular, connects the inlet chamber 15 (defined by the level 6 housing portion) with the top of the tank 16 (shown schematically in FIG. 2) and also provides the connection between the outlet chamber 34 (also defined by the level 6 housing portion) with the riser tube 28 forming part of the tank 16 and shown schematically in FIG. 2.

The level 5b housing portion 354 also defines the external venturi chambers 80 in which venturi nozzles may be installed. As indicated above, the throats of the nozzles communicate with a source of regeneration solution, such as brine. A conduit connection 374 forms part of the external chamber 80 and serves as the means for connecting the venturi to the source of regeneration solution. An access plate or plug 80a which is secured to the top of the venturi chamber 80 by a pair of fasteners 373, provides access to an associated venturi nozzle. The plug 80a is easily removable to service, install or remove a venturi nozzle.

Turning now to FIG. 5, details of the valve plate assembly 340 which is clamped between the level 3 and level 5a housing portions 330, 348 are shown. The drain valve 118 includes a piston head 376 and stem 378. The stem 376 extends through an associated aperture 380 in the valve plate and is secured to a valve head 382. In order to maintain alignment of the valve head with respect to its seat, a pair of spaced apart quad rings 384, 386 are used to slidably guide the piston stem 378. The quad ring 386 is held in the valve plate 340, whereas the upper quad ring 384 is held by the level 3 housing portion 330. The inlet valve 24 comprises the piston head 52 and the piston stem 54. The piston stem 54 extends through an associated aperture 388 and is secured to an associated inlet valve head 50. A pair of quad rings 390, 392 are used to sealingly engage the piston stem and to maintain alignment of the inlet valve 24 as it is reciprocally moved. The outlet valve 32 includes the piston head 64 and the valve stem 67. The valve stem 67 extends through an associated aperture 393 in the valve plate 340 and is supported for sliding movement by a pair of spaced apart quad rings 394, 396. The lower end of the stem mounts the valve head 62.

The valve plate 340 also reciprocally mounts the purge valve 124, the initiate next regeneration valve 126 and the regeneration control valve 120. These valve components are also slidably mounted in apertures defined by the valve plate 340 and include associated O-ring seals for sealingly the associated valve stems against leakage. A valve stem 400 of the purge valve 124 mounts a valve element 402 engageable with an associated seat 404 defined by the level 5a housing portion 348. Sealing of the element 402 may be achieved by a sealing member 402a. The initiate next regeneration valve 126 and the control valve 120 also include stems that extend through the valve plate 340 and mount respective valve heads 406, 408 also engageable with seats defined by the level 5a housing portion 348.

Although the valve elements or valve heads 50, 62 and 382 may be unitary members with sealing surfaces created using "over molding" methods, in the embodiment illustrated in FIG. 5, the valve elements comprise assemblies.

In particular, the valve head 62 which forms part of the outlet valve 32 includes a seal holder 409a which is secured to the stem 67 as by a threaded connection. Other types of connections, such as adhesive bonding, are also contemplated. The holder 409a provides support for a seal 409b which is held to the holder 409a by a retainer 409c. The retainer 409c may be secured to the holder 409a by a plurality of fasteners (not shown) which extend through the retainer 409c and the seal 409b and threadedly engage the holder 409a.

The valve head 382 which forms part of the drain valve 118 is similarly constructed. It includes a holder 411a which is secured to the drain valve stem 378 as by a threaded connection. As seal member 411b is held to the holder 411a by a retainer 411c. Again, fasteners (not shown) can be used to secure the retainer 411b and, hence, the seal element 411b to the holder 411a.

The valve head 50 which forms part of the inlet valve 52 also comprises assembly. However, as explained earlier, the inlet valve 24 includes two sealing surfaces engageable with spaced apart seats 58a, 58b (shown in FIG. 2). As seen in FIG. 5, the valve head 50 includes a holder 413a which is secured to the inlet valve stem 54 as by a threaded connection. The holder 413a mounts two sealing elements 413c, 413d. The sealing element 413c is sealingly engageable with the associated seat 58a (shown in FIG. 2). The sealing element 413d is engageable with the seat 58b (shown in FIG. 2). The sealing member 413c is held to the holder by a retainer 413e. A plurality of fasteners 415 may be employed to secure the retainer 413e and, hence, the seal member 413c to the holder 413a. A lower retainer 413f is used to secure the lower seal member 413d to the holder 413a.

As indicated above, the valve heads 50, 62 and 382 may be constructed as unitary members with sealing surfaces created using known over molding techniques. FIG. 5A illustrates an alternate construction for the valve head 50' which includes integral sealing elements 413c', 413d'. The construction shown in FIG. 5A eliminates the need for the separate seals and retainers shown in FIG. 5. In addition, it has been found that the valve head shown in FIG. 5 can also be used to replace the valve heads 382 and 60 shown in FIG. 5 in order to reduce manufacturing costs. It should be noted that the valve heads 60 and 382 require only a single sealing surface. The upper sealing surface shown in FIG. 5A as part of the valve head 50' is not used when the valve element construction shown in FIG. 5A is used to replace the valve heads 382 and 60.

Figure 6:
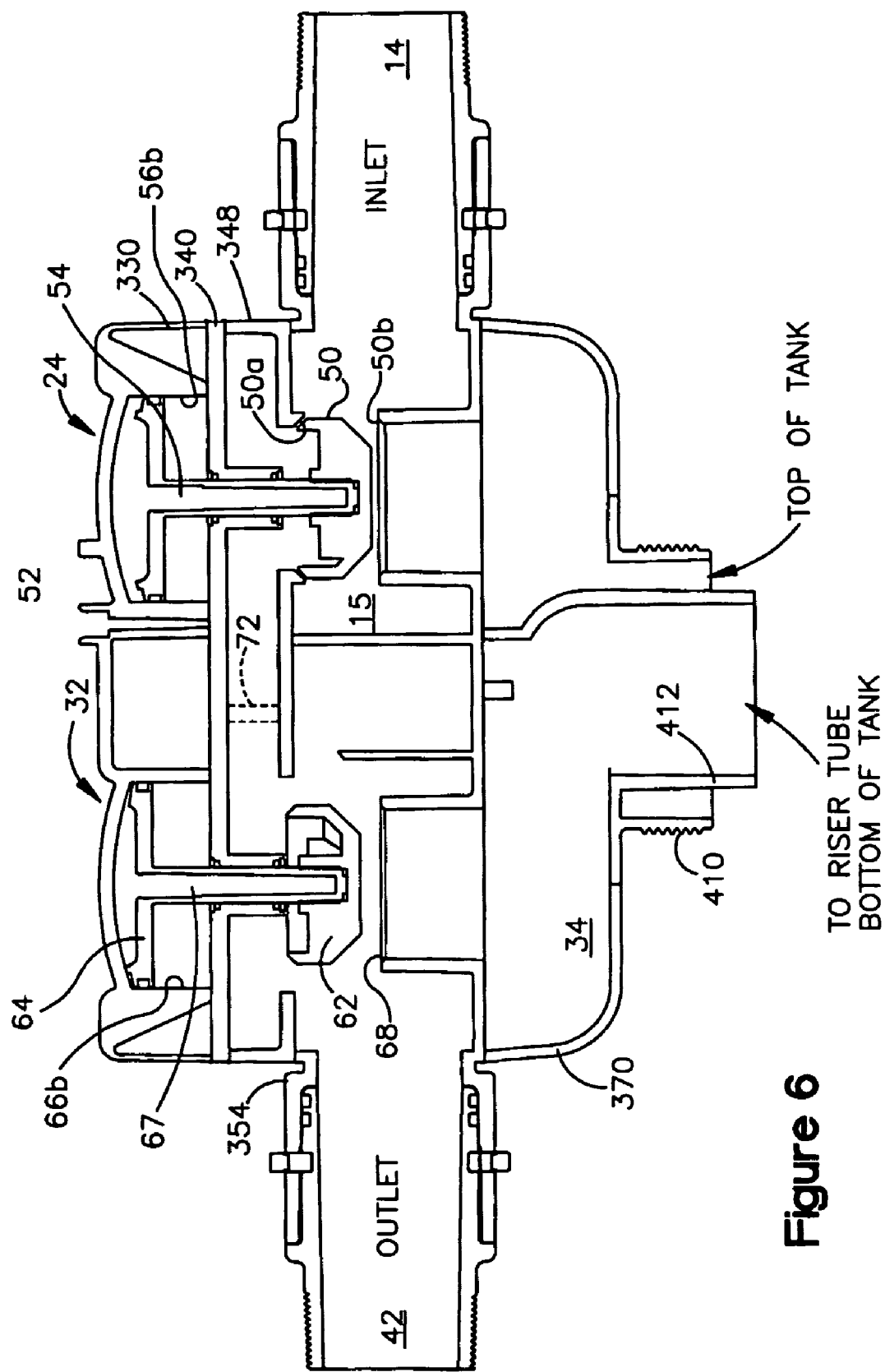
FIG. 6 is a cross-section, shown somewhat schematically, of portions of the control valve shown in FIG. 1.

FIGS. 6-10 schematically illustrate the construction and modes of operation of the control valve 10 shown in FIG. 1. FIG. 6 illustrates the position of the inlet valve 24 and the outlet valve 32 when the tank is online and treating water. As seen in FIG. 6, the inlet valve 24 is driven to its upper position so that its valve element or valve head 50 is spaced from its associated seat 50b defined by the level 5b housing portion 354. In this position, water to be treated can flow from the inlet 14 into the top of the tank via the tank neck connection 410. Referring also to FIG. 2, the water flows into the tank down through the treatment material 16a and exits the tank through the riser tube 28 which is connected to the outlet fitting 412 forming part of the control valve. The treated water passes the open outlet valve 32 and into the control valve outlet (shown as 42 in FIG. 2).

Figure 7:
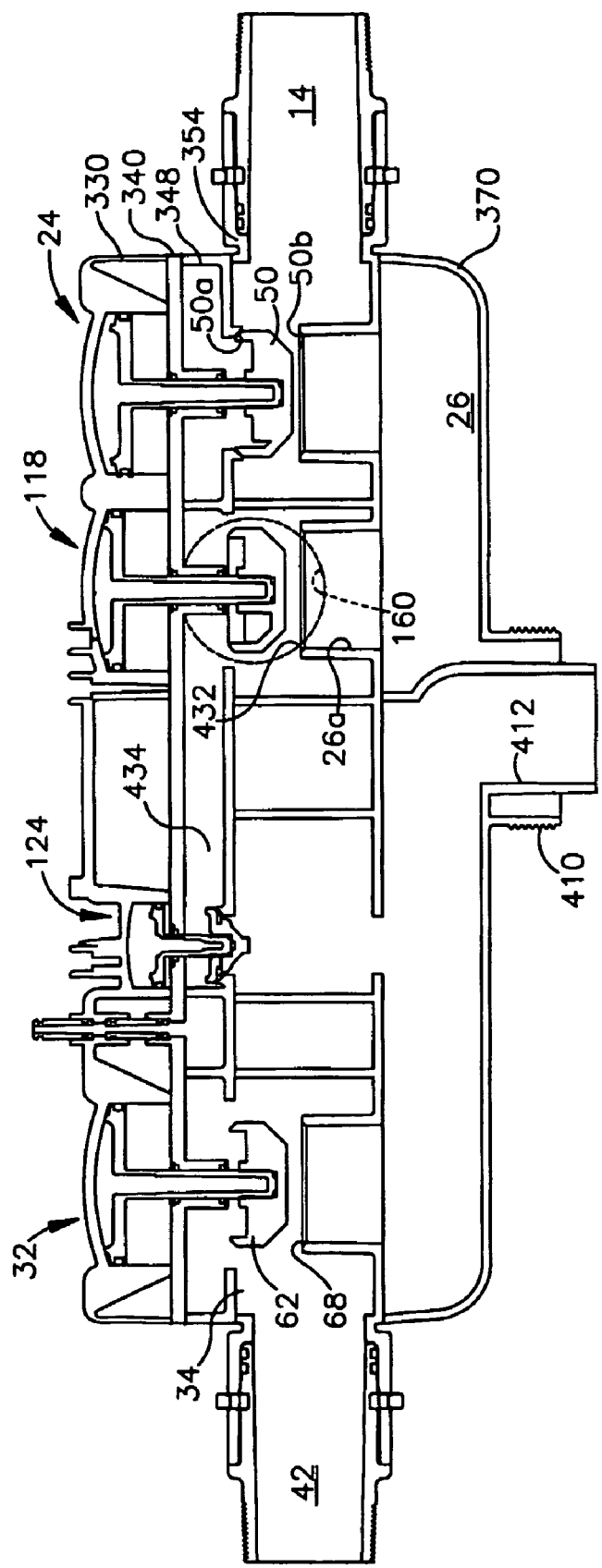
FIG. 7 is another cross-section, shown somewhat schematically, of the control valve.

FIG. 7 illustrates the relationship and flow passages associated with the outlet valve 32, the purge valve 124, the drain valve 118 and the inlet valve 24. The drain valve 118 communicates with the inlet passage 26 (also FIG. 2) via a short passage segment 26a. Rinsing of the tank usually occurs in a counterflow direction. When rinsing is desired, the outlet valve 32 is opened to allow water in the outlet chamber 34 (which generally can be obtained from another tank or source of water) to enter the tank 16 through the riser tube 28 which is connected to the tank connection 412. The inlet valve 24 is generally closed (driven into contact with the seat 50b) on order to seal the inlet 14 from the tank. If the drain valve 118 is opened, as illustrated in FIG. 7, water entering the tank 16 via the riser tube 28 flows through the tank in a reverse flow direction and is discharged to the drain passage 160 via the open drain valve 118 (shown in FIG. 7).

The disclosed control valve is also capable of a co-current rinse. To achieve this step, the outlet valve 32 and drain valve 118 are closed (moved onto sealing contact with respective seats 68, 423. The inlet valve 24 and the purge valve 124 are opened. As seen in FIG. 7, the open inlet valve 24 allows water to enter the tank via the neck coupling 410, pass through the treatment material 16a (FIG. 2) and exit the tank through the riser tube 28 FIG. 2) and tank connection 412. Since the outlet valve 32 is closed, this rinse water cannot proceed to the outlet. Instead, it is discharged to the drain passage 160 by virtue of the open purge valve 124 (the purge valve is shown as closed in FIG. 7) which communicates with the drain passage 160 via passage 434.

Figure 8:
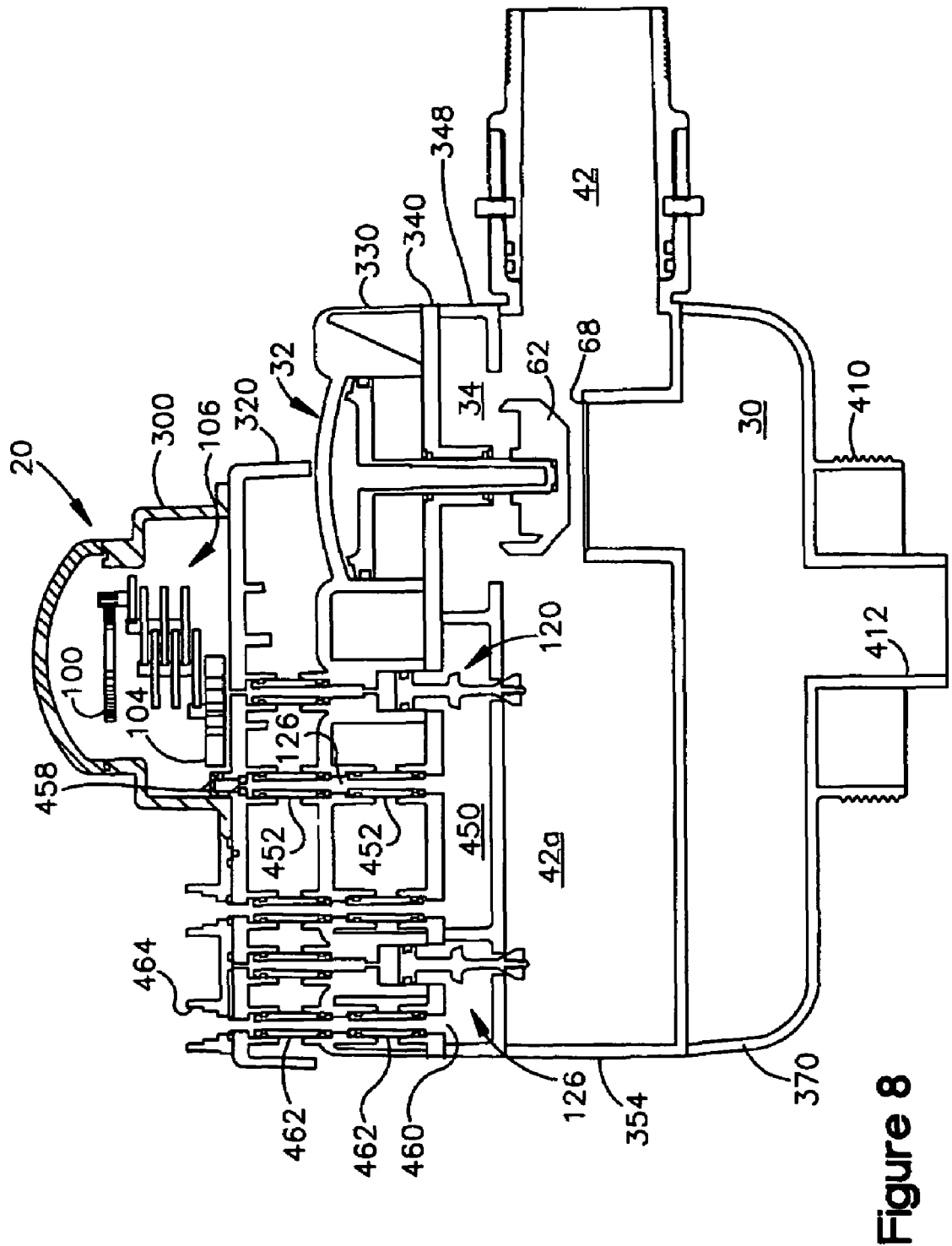
FIG. 8 is a cross-section, shown somewhat schematically, of the control valve.

FIG. 8 illustrates the fluid connections and communications that are used to provide an initiate next regeneration signal and to energize the regeneration turbine. As indicated above, the disclosed control valve may be used in conjunction with other valve/tank assemblies which would remain on-line while a given tank is being regenerated. These other valve/tank assemblies may be used to provided a source of treated for use during the regeneration of an exhausted tank. Referring to FIG. 8, the regeneration control valve 120 and the initiate next regeneration valve 126 communicate with the valve outlet 42 via the passage 42a. When a tank is to be regenerated, generally the outlet valve 24 (the valve is shown opened in FIG. 8) will be closed in order to seal the outlet of the tank from the outlet part of the valve and, hence, the rest of the treatment system. To effect regeneration, an appropriate fluid signal is sent to the control valve (via signal line h shown in FIG. 2) in order to drive it to an open position. In this position, water in the outlet passage 42a is allowed to proceed to an intermediate passage 450 and then to the passage 136 (shown also in FIG. 2) which is defined by molded passage structure in the level 3, level 2 and level 1 housing portions 330, 320, 300, as well as short radial conduit segments 452 which interconnect the housing portions. Water in the outlet passage 42a is thus allowed to proceed to a nozzle 458 which directs the stream of water against the turbine 104 to produce rotation therein. Rotation of the turbine 104 effects rotation of the control disc 100 via the gear train/pall mechanism 106, 314 (FIG. 4).

The initiate next regeneration 126 is opened by an appropriate signal from the servo control via signal line g (shown in FIG. 2). Opening of the initiate regeneration valve 126 (it is shown closed in FIG. 8) allows water in the outlet passage 42a to flow into a passage 460 defined by the level 5a, level 4, level 3 and level 2 housing portions 348, 340, 330, 320 and associated conduit segments 462. The passage 460 terminates in a port 464 that is connectable to an initiate regeneration port 130 located on another control valve 10. The communication of pressurized water to the initiate regeneration port on another tank begins the regeneration process in the other tank.

As indicated above, the disclosed control valve and associated tank may form part of a multi-tank system where each tank has its own control valve 10. However, the control valve may be used as part of a single tank system. When used in this application, the wall 72 (see FIG. 2) of the bypass chamber 70 is removed in order to enable communication between the bypass chamber 60 and the outlet chamber 34. The bypass feature of the control valve 10 is normally utilized a single tank system. According to this feature, when the tank 16 is to be regenerated, the water at the inlet 14 is transferred directly to the outlet 40 so that water supply is not interrupted during regeneration of the tank. When used in a single tank application, the regeneration and rinse steps are effected with the source water, i.e., water at the inlet 14, rather than treated water.

As indicated above, when both the inlet and outlet valves 24, 32 are closed, and the bypass blocking wall 72 is absent, inlet water can flow directly to the outlet chamber 34 (from the inlet 14). To provide a countercurrent regeneration, the outlet valve and the drain valve 118 are opened which allows source water to flow from the outlet chamber 34 into the conduit 30 and, hence, through the countercurrent regeneration venturi 81*b* via the venturi feed passages 86*b*, 86*a* and is ultimately discharged to drain via the opened drain valve. When the source of regeneration chemistry is terminated, the flow of water along the passages 86*b*, 86*a* provides a slow rinse. A downflow fast rinse can be achieved by opening the inlet valve 24 and the purge valve 124, which allows water to flow through the tank 16 and into the drain 150, via the open purge valve 124.

A co-current regeneration is effected by opening the purge valve 124 while maintaining closure of the inlet and outlet valves 24, 32. In this state, water can flow along the venturi flow path (passages 82*a*, 82*b*; venturi 81*a*) drawing regeneration chemistry through the conduit 84. A backwash can be achieved by closing the purge valve 124, opening the outlet valve 32 and the drain valve 118.

When the tank is placed back on line, the inlet valve 24 and outlet valve 32 are both opened. Because the inlet valve includes dual seats (50*a*, 50*b*), the bypass chamber 70 is isolated from the inlet chamber 15 by virtue of the engagement of the valve element 50 with its associated upper seat 50*a* (see also FIG. 6).

Figure 9:
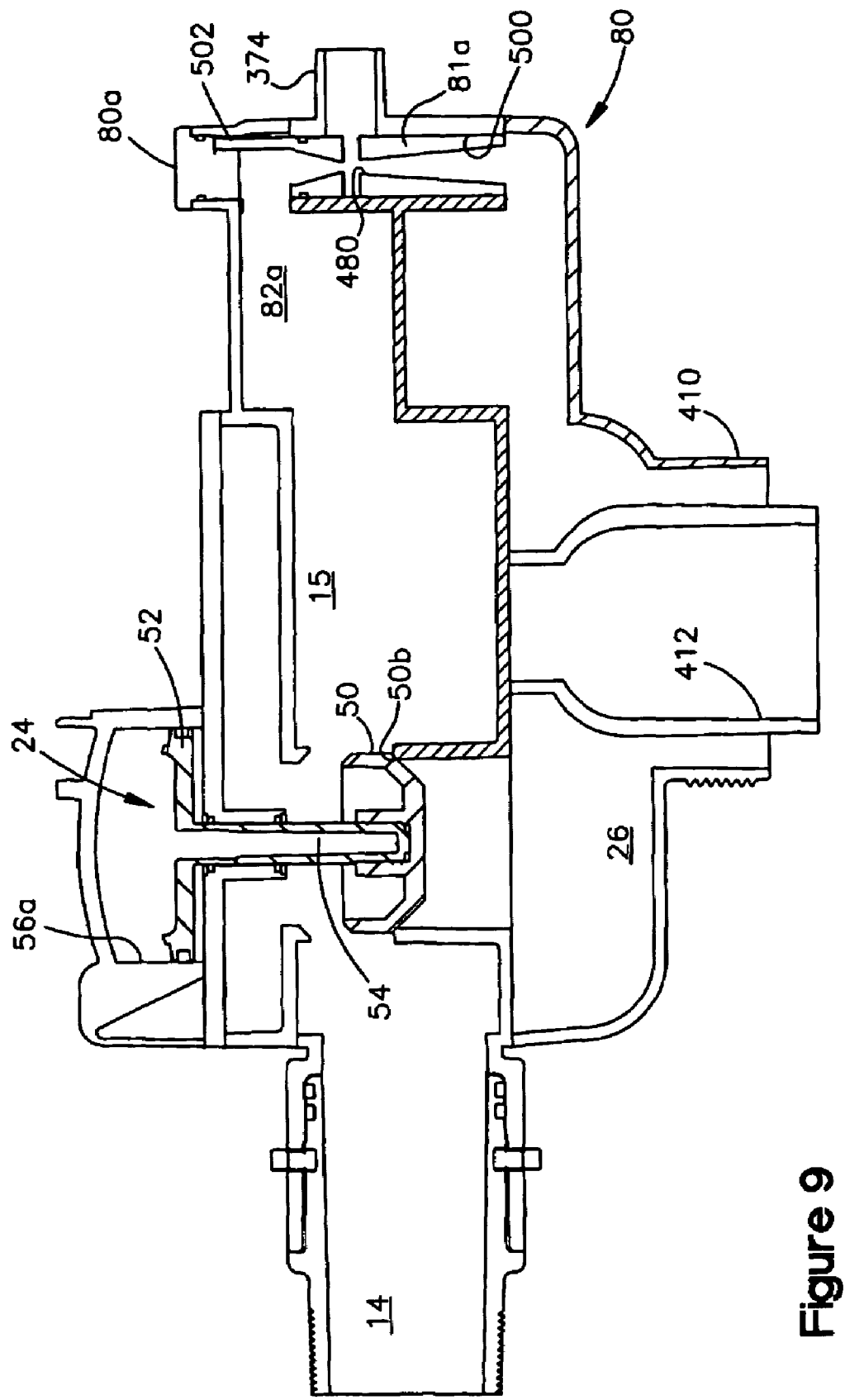
FIGS. 9, 10 and 11 are also schematic cross-sections showing details of venturis and associated control components forming part of the control valve.

FIG. 9 illustrates the fluid communications that occur within the valve 10 to provide a co-current regeneration step. As seen in FIG. 9, the inlet valve 24 (which is dual acting) is driven into engagement with its lower seat 50*b*, thus sealing the inlet 14 from the passage 26 which is connected to the top of the tank via the connector 410. Although, not shown, the outlet valve is also driven to its closed position. The purge valve, on the other hand (not shown), is opened in order to communicate the riser tube 28 of the tank 16 with the drain 150 (see FIG. 2). As seen in FIG. 9, water at the inlet 14 can proceed along a passage 82*a* which communicates with the inlet chamber 15. The water in the passage 82*a* is delivered to the venturi 81*a*. As it flows through the throat 480 of the venturi 80*a*, regeneration chemistry is drawn into the venturi water stream via the connector 374 which is normally connected to a source of regeneration solution, such as brine. The regeneration chemistry drawn into the venturi is mixed with the water delivered by the passage 82*a* and flows into the top of the tank via the connector 410. The regeneration solution passes through the treatment material 16*a* (FIG. 2) and exits the tank through the riser tube 28 connected to the tank connection 412. The regeneration solution is then communicated to drain 150 via the passage 30 (see FIG. 2) and the opened purge valve 124.

Figure 10:
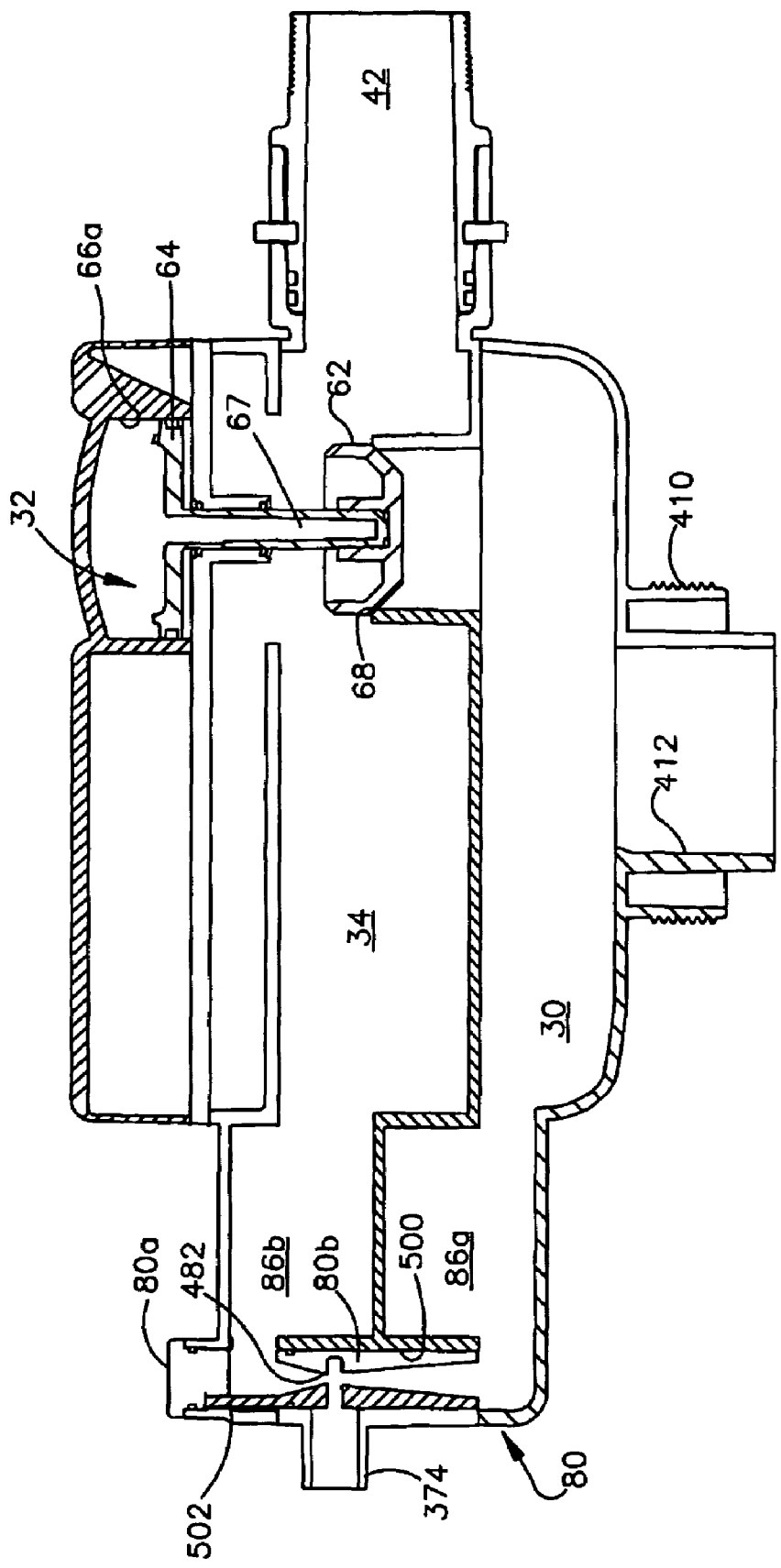
Figure 11:
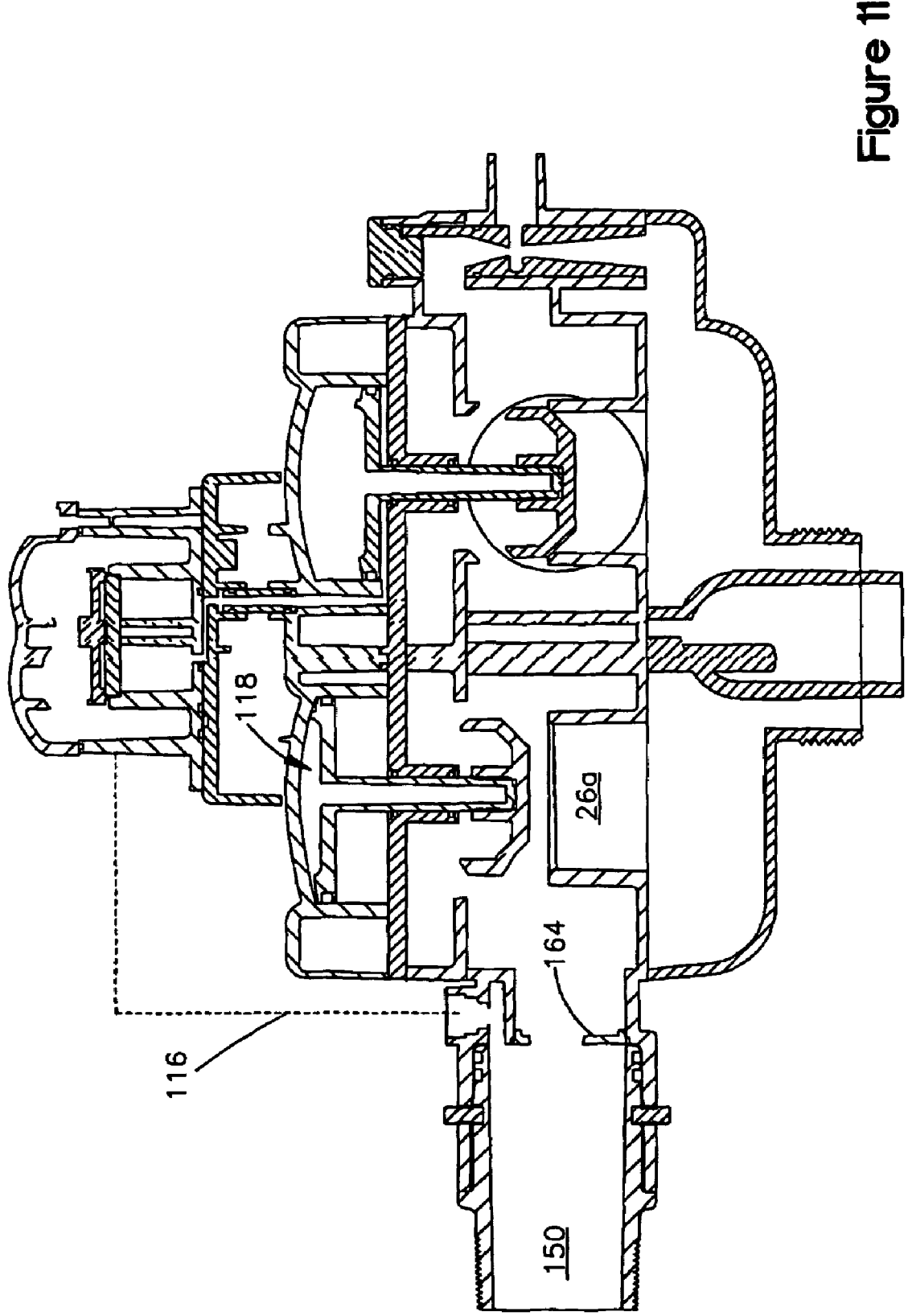
Figure 12:
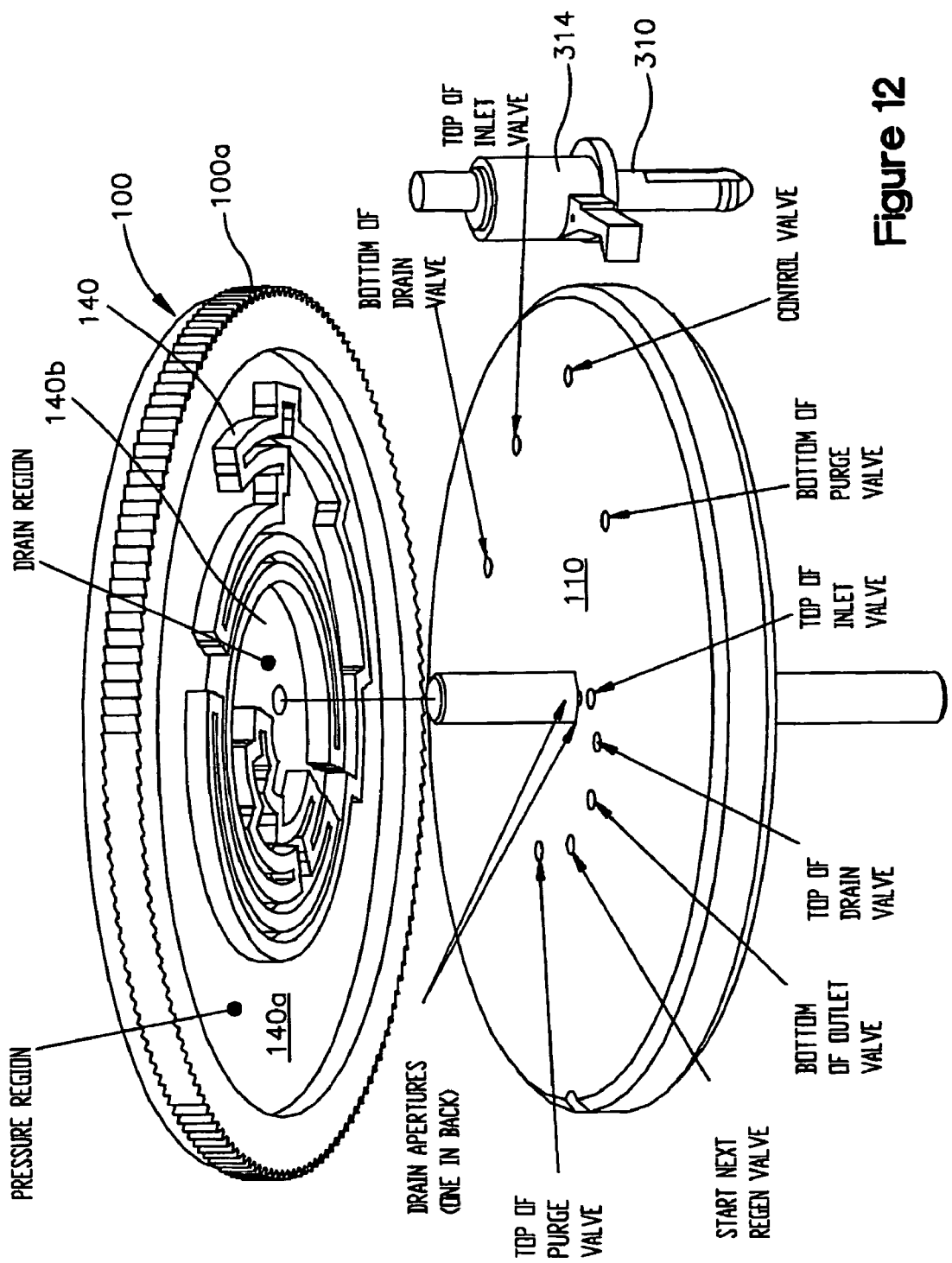
FIG. 12 illustrates, somewhat schematically, a regeneration control disc and port insert and associated drive, forming part of the control valve shown in FIG. 1.

FIG. 10 illustrates the fluid communications that are established in order to provide a countercurrent regeneration. When a countercurrent regeneration is desired, both the inlet valve 24 and the outlet valve 32 are driven to their closed positions. The drain valve 118 is opened in order to communicate the top of the tank with an ambient drain via passage 26 and 160 (see FIG. 2). With the valves in the described positions, water in the outlet chamber 34 is communicated to a venturi 80*b* via the passage 86*b*. As the water passes through a throat 482 of the venturi 80*b*, regeneration chemistry is drawn into the venturi stream via the connector 374 which is generally connected to a source of regeneration chemistry, such as brine. The brine mixes with the water passing through the venturi throat to create a regeneration solution which is then delivered to the tank via the riser tube 28 which is connected to the tank connector 412 (also outlet passage 30). The regeneration solution travels through the tank in a countercurrent direction, i.e., from the riser tube, and out through the material 16*a*. The regeneration solution leaves the tank through the connection provided by the neck 410 and is discharged to the drain 150 via the passage 26*a*, the drain valve 118 and the passage 160 (see FIG. 2).

The co-current and countercurrent regeneration steps illustrated in FIGS. 9 and 10 can be followed by a slow rinse and (in the same flow direction as the regeneration step) by terminating the flow of regeneration chemistry to the connectors 374. Generally, the termination of the supply of regeneration chemistry in order to effect a slow rinse is controlled by a device, i.e., brine valve external to the control valve 10.

Referring to FIGS. 4, 9 and 10, the venturis 81*a*, 81*b* are easily serviced and/or replaced. (In FIG. 4, the venturi is referred to by the reference character 81.) Unlike prior art constructions, the control valve 10 does not need to be disassembled in order to gain access to the venturis 81*a*, 81*b*. In the preferred embodiment of this feature, the cover 80*a* is plug-like in construction and overlies a bore 500 which is configured to receive an associated venturi. In the preferred embodiment, the venturi is attached to the cover 80*a* by means of an extension member 502. Referring, in particular, to FIG. 4, the cover 80*a* includes a transverse lug 504. The transverse lug is engageable by an oblong aperture 502*a* formed in the extension 502. To install the venturi 81, the lug 504 in the cover 80*a* is inserted into the aperture 502*a*, thus coupling the cover 80*a* to the venturi. The assembly is then inserted into the bore 500 which is defined by the housing members 348, 354. The venturi 81 sealingly engages the bore 500 and includes an O-ring seal 505. Referring also to FIG. 9, the venturi 81 includes axial passages 507 which communicate the throat 480 of the venturi with the regeneration chemical supply via the connector 374. Finally, it should be apparent that removal of the cover 80*a* causes the associated venturi to be 70 pulled from its bore 500 by virtue of the engagement of the lug 504 with the aperture 502*a*.

With this feature, the venturis 81*a*, 81*b* can be serviced and replaced relatively easily. Only the cover 80*a* need be removed in order to gain access to the venturi chamber 80.

The present invention has been described in connection with a water treatment apparatus. It should be understood, however, that principles of this invention can be applied to systems that treat fluids other than water. Accordingly, the present invention should not be limited to apparatus and methods for treating water.

Although the invention has been described with a certain degree of particularity, it should be understood that those skilled in the art can make various changes to it without departing from the spirit or scope of the invention as hereinafter claimed.

I claim:

1. A water treatment apparatus, comprising:
    a) at least one water treatment tank defining a fluid flow path between a tank inlet and a tank outlet, and including a compartment containing a water treatment material through which water to be treated is passed;
    b) a control device in fluid communication with said tank inlet and said tank outlet for controlling fluid flow along said tank fluid flow path and for controlling the regeneration of said water treatment material in said tank compartment, said control device including:
  i) a housing;
  ii) a pair of venturi chambers defined by said housing, one of said chambers operative to provide a co-current regeneration of said material and the other of said venturi chambers operative to provide a countercurrent regeneration of said media;
  iii) a fluid pressure operated inlet valve for controlling the communication of a source of water to be treated with said tank inlet;
  iv) a fluid pressure operated outlet valve for controlling the communication of said tank outlet with a discharge conduit;
  v) a fluid pressure operated drain valve for controlling the fluid communication between said tank inlet and an ambient drain;
  vi) a fluid pressure operated purge valve for controlling the fluid communication of said tank outlet with said ambient drain; and,
  vii) a fluid pressure operated regeneration initiation control valve for providing a fluid signal, under predetermined operating conditions, to a remote control device for initiating regeneration in a tank associated with said remote control device.

2. The apparatus of claim 1, wherein said control device includes:
  a) an inlet chamber in communication with said source of water to be treated;
  b) a transfer chamber in selective communication with said inlet chamber; and,
  c) said inlet valve controlling the communication of water in said inlet chamber with said tank inlet and further including structure for controlling communication between said inlet chamber and said transfer chamber.

3. The apparatus of claim 2, wherein said inlet valve includes a first seat for controlling the communication between said inlet chamber and said tank inlet and a second seat for controlling the fluid communication between said inlet chamber and said transfer chamber.

4. The apparatus of claim 1, wherein said control device includes a regeneration turbine operatively coupled to a fluid signal control system,
  said control system operative to provide fluid signals to said inlet valve, said outlet valve, said drain valve, said purge valve and said regeneration initiation control valve in a predetermined sequence, said regeneration turbine in fluid communication with a regeneration initiation port forming part of said valve, such that a regeneration sequence can be initiated upon application of a fluid signal to said regeneration initiation port.

5. The apparatus of claim 1, wherein said drain and purge valves communicate with said ambient drain via a flow control element which controls the rate of flow of fluid from said purge and drain valves to said drain.

6. The apparatus of claim 1, wherein at least one of said venturi chambers includes a replaceable venturi element, the throat of which communicates with a source of regeneration fluid.

7. The apparatus of claim 6, wherein said venturi chamber includes an access cover by which access to said venturi element is obtained.

8. The apparatus of claim 7, wherein said throat of said venturi element communicates with a source of regeneration fluid via a port forming part of said housing.

9. The apparatus of claim 8, wherein said housing defines an external port communicating with said regeneration initiation control valve, said port connectable to said remote control device.

10. A control valve assembly for controlling the communication of water to and from a treatment tank and for controlling the regeneration of a treatment material contained by a tank, comprising:
  a) a control valve housing defining structure for connecting said control valve to a tank inlet and a tank outlet;
  b) an inlet chamber and an outlet chamber defined by said housing, said inlet chamber communicating with a source of water to be treated and said outlet chamber communicating with an outlet port forming part of said control valve;
  c) a fluid pressure operated inlet valve for controlling the communication of said inlet chamber with said tank inlet;
  d) an outlet valve for controlling the fluid communication between said tank outlet and said outlet chamber;
  e) a pair of venturi chambers, one of said chambers being adaptable to provide co-current regeneration of said treatment tank and the other of said venturi chambers adaptable to provide countercurrent regeneration of said treatment tank; and,
  f) at least one of said venturi chambers including a removable access member by which a venturi element within the chamber can be accessed without requiring further disassembly of said control valve.

11. The control valve assembly of claim 10, wherein said other of said venturi chambers also includes a removable access member by which a venturi element within the other chamber can be accessed without requiring further disassembly of said control valve.

12. The control valve assembly of claim 11, wherein said venturi element in said co-current venturi chamber establishes a communication between said inlet chamber and said tank inlet and a throat of said venturi element communicates with a source of regeneration fluid.

13. The control valve assembly of claim 11, wherein said venturi element in said countercurrent venturi chamber establishes a fluid communication between said tank outlet and said outlet chamber and a throat of said venturi element communicates with a source of regeneration fluid.

14. The control valve assembly of claim 10, further including a first regeneration control valve operative, under predetermined operating conditions, to communicate water in said outlet chamber to a remote control valve assembly associated with a remote treatment tank in order to initiate regeneration of said remote tank.

15. The control valve assembly of claim 10, further including a servo control system operative to provide fluid signals to fluid pressure operated valves in said control valve assembly in a predetermined sequence and a regeneration control turbine for driving a control disc forming part of said servo control system, said housing defining a fluid flow path for directing water in an impinging relationship with said turbine, said fluid path communicating with a fluid source external to said control valve assembly whereby regeneration of said treatment tank is initiated.

16. The control valve assembly of claim 10, further including a fluid pressure operated drain valve for controlling the communication of said tank inlet with an ambient drain and a fluid pressure operated purge valve for controlling the communication of said tank outlet with said ambient drain.

17. The control valve assembly of claim 10, further including a regeneration control valve for controlling the communication of water in said outlet chamber with said regeneration turbine, said regeneration control valve operative to convey water from said outlet to said regeneration turbine in order to rotate said turbine under predetermined operating conditions.

18. The control valve assembly of claim 10, further including a bypass chamber in fluid communication with said outlet chamber, said inlet valve controlling the fluid communication between said inlet chamber and said bypass chamber, such that under predetermined operating conditions, said inlet valve allows water in said inlet chamber to travel directly to said outlet chamber via said bypass chamber without passing through said treatment tank.

* * * * *